July 9, 1929.  K. MAYBACH  1,720,182
DIESEL ENGINE
Filed May 12, 1927   3 Sheets-Sheet 1

Inventor:
Karl Maybach

Inventor:
Karl Maybach

Patented July 9, 1929.

1,720,182

UNITED STATES PATENT OFFICE.

KARL MAYBACH, OF FRIEDRICHSHAFEN, BODENSEE, GERMANY, ASSIGNOR TO MAYBACH-MOTORENBAU GESELLSCHAFT MIT BESCHRANKTER HAFTUNG, OF FRIEDRICHSHAFEN, BODENSEE, GERMANY.

DIESEL ENGINE.

Application filed May 12, 1927, Serial No. 190,870, and in Germany May 17, 1926.

My invention relates to Diesel engines and has special reference to engines of this type having airless injection.

For such engines it is necessary that the air compressed by the piston be extremely turbulent so as to ascertain a most perfect mixture with the fuel injected therein.

It is an object of my invention to increase the turbulence of the compressed air.

A further object of my invention is improvement in the intensity of the mixture by arranging for a special way in which the compressed and turbulent air and the injected fuel meet.

Furthermore my invention improves the output and the effectiveness of the Diesel engine by special arrangement of the intake and exhaust valves in relation to each other and also to the individual cylinder.

There are many other improvements connected with my invention which will best be pointed out, together with the above mentioned ones, when referring to the drawings which represent examples embodying my invention.

A main feature of a Diesel engine constructed in conformity with my invention is the arrangement of a chamber separated from the cylinder but in connection with its upper inner portion by means of a channel or sleeve, the shape of said chamber being such and the opening of the channel into the chamber being so situated that the air pressed into the chamber by the upward stroke of the piston forms an eddy or whirl closed in itself. Into this eddy or whirl according to my invention the fuel is injected. This may be done in any direction but under certain circumstances it may be preferable to give the injecting nozzle a special direction so as to attain a good distributing and spraying effect. To increase this effect it may be advisable in the lateral direction to incline the fuel nozzle to make sure that the fuel meets almost every portion of the air whirl's cross section.

As to the shape of the mixing chamber I prefer a cylinder-like shape, the channel connecting to the engine cylinder opening into the chamber sideways, more or less like a tangent to the circular cross section of the chamber. This appears to me to reach best the effect according to my invention which is a closed eddy or whirl of compressed air in the chamber.

The mouth of the channel in the engine cylinder may be situated anywhere in the cylinder's top or head. But I prefer to arrange it in the side wall of the cylinder close to the cover or bottom, as it may be. This latter arrangement has the advantage that the piston at the end of its upward stroke slowly covers the opening of the connecting channel in the cylinder wall and thereby it gradually reduces the cross section of this overflow. This reduction in cross section causes an increase in the speed of the passing air which is most desirable at the end of the piston stroke when the velocity of the piston itself is reduced anyhow. For the purpose of increasing this effect the cross section of the overflow channel, according to my invention, is of an upwardly tapering shape.

Another main feature of my invention is the arrangement of the inlet valve and of the outlet valve both in the walls of the mixing chamber. If the chamber has a substantially cylindrical shape I prefer to arrange the valves one in the top the other in the bottom thereof so that they are situated oppositely each other. This has besides other advantages that of good and easy accessibility to the valves. It also simplifies the arrangement of the valve operating members if the cylindrical chamber with its longitudinal axis is substantially parallel to the axis of the main motor cylinder to which it is attached which means that the valve shafts will be directed up and down in upright motors.

Having given a general description of my invention I now want to point it out in detail referring to the drawings which represent several examples embodying my invention.

Figure 2:
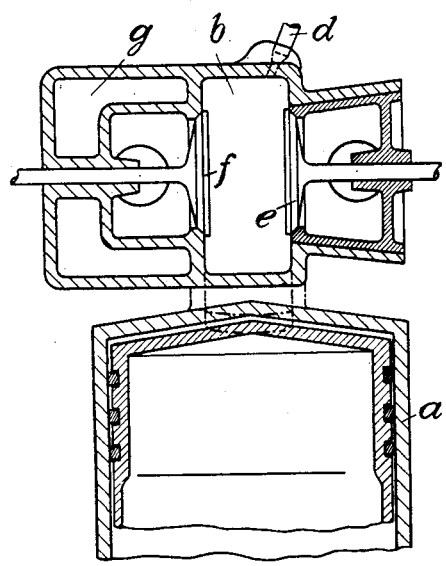
Fig. 2 is the corresponding vertical section through the same but in a plane at right angles to that of Figure 1, taken on line A—A of the figure.
Figure 1:
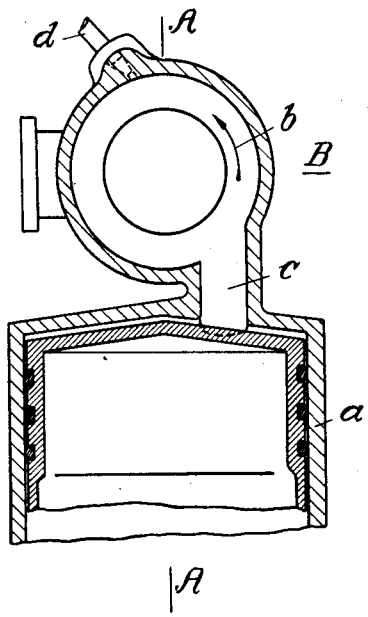
Fig. 1 is a vertical section through the head of an engine cylinder with a mixing chamber on top thereof.
Figure 3:
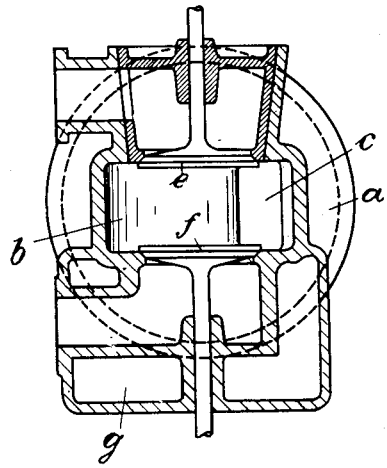
Fig. 3 is a horizontal section through the mixing chamber taken on line B—B of Fig. 1.
Figure 4:
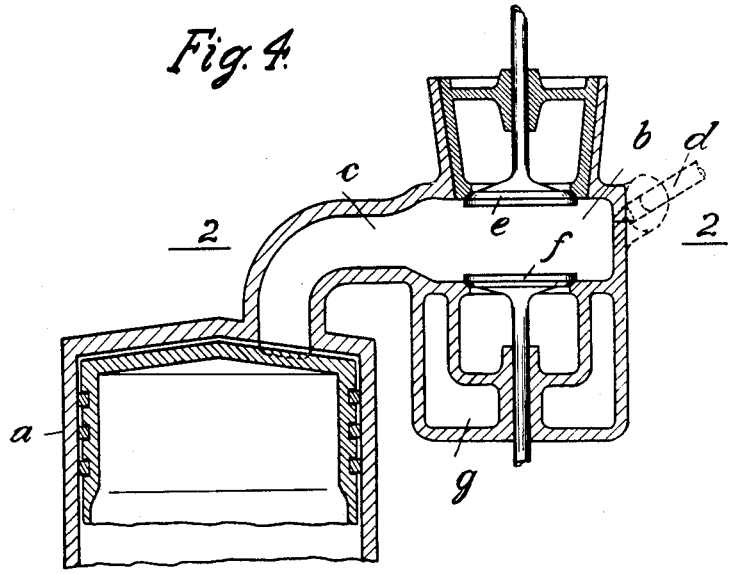
Fig. 4 is a vertical section through the head of an engine cylinder and the mixing chamber connected therewith resembling that of Fig. 1 but giving another modification in which the axis of the cylindrical mixing chamber is parallel to the axis of the engine cylinder whereas in Fig. 1 these axes are at right angles to each other.
Figure 5:
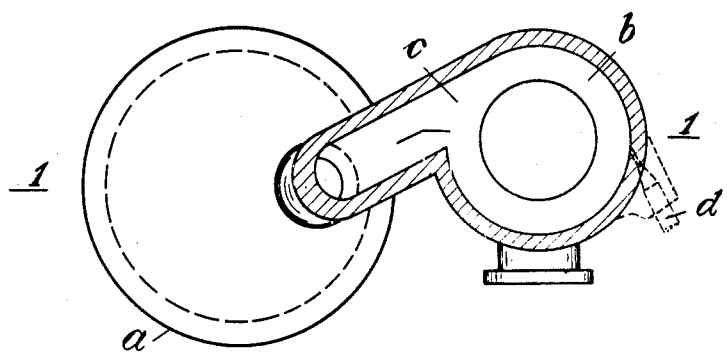
Fig. 5 represents a horizontal cross section (partly view) taken on line 2—2 of Fig. 4.
Figure 6:
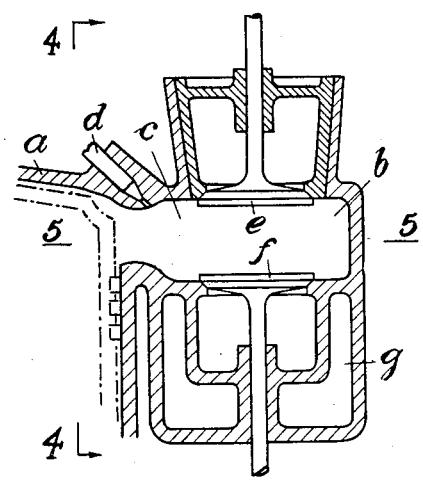
Figure 7:
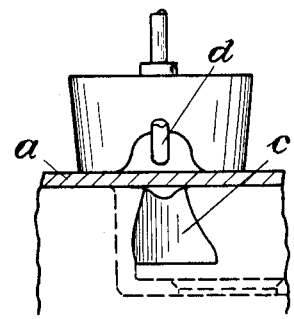
Figure 8:
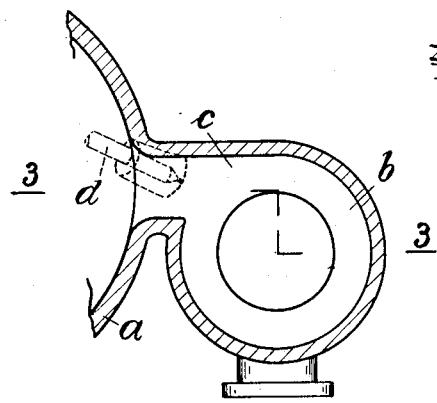

Figs. 6, 7 and 8 represent another modification in which the channel connecting the engine cylinder with the mixing chamber opens into the side wall of the engine cylinder. Fig. 6 is a vertical cross section through the mixing chamber. Fig. 7 is a view partly in section taken on line 4—4 of Fig. 6, from the inside of the engine cylinder towards the opening of the connecting channel. Fig. 8 is a horizontal section through the mixing chamber taken on line 5—5 of Fig. 6.

Figure 9:
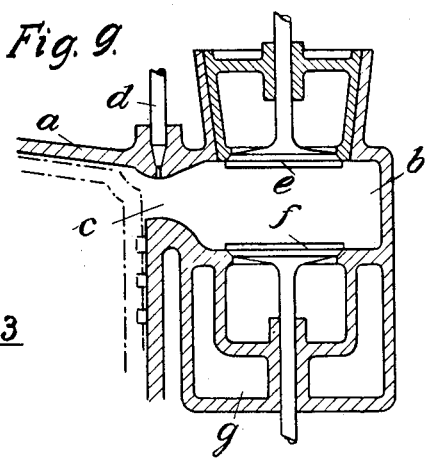

Fig. 9 is a vertical section almost identical to that of Fig. 6, but showing another direction of the fuel nozzle.

In the figures $a$ represents the cylinder wall, $b$ is the mixing chamber, and $c$ the connecting channel. The fuel nozzle is designated by the letter $d$.

Especially referring to the example represented in Figures 6, 7 and 8, I want to point out the upwardly tapering shape of the cross section of the connecting channel $c$ (Fig. 7). This opening is gradually covered by the piston shown in dotted lines in Fig. 6, on its upward stroke and thereby the reduction of the size of this cross section compensates for the reduction in air speed caused by the slower movement of the piston on its upper way so that the velocity of the air through the channel $c$ and into the chamber $b$ will possibly even be increased. Accordingly a great intensity of the air whirl inside the chamber will be attained.

The intake valve is designated by the letter $e$, whereas $f$ is the exhaust valve, surrounded by a water jacket $g$.

I do not want to be limited to the details described or shown in the drawings, as many variations will occur to those skilled in the art.

What I claim is:

1. A Diesel engine with airless injection comprising a motor cylinder; a fuel mixing chamber; and a channel connecting said mixing chamber with said motor cylinder; said mixing chamber being of substantially cylindrical shape; said connecting channel opening into said mixing chamber in a direction which is substantially that of a tangent to the substantially circular cross section of said mixing chamber; the other end of said channel opening into the side wall of said motor cylinder, the opening of said second end with its lowest portion being situated lower than the uppermost position of the piston moving up and down in said cylinder.

2. A Diesel engine comprising a motor cylinder; a fuel mixing chamber; and a channel connecting said mixing chamber with said motor cylinder; said mixing chamber being of substantially cylindrical shape; and said connecting channel opening into said mixing chamber in a direction which is substantially that of a tangent to the substantially circular cross section of said mixing chamber; the other end of said channel opening into the side wall of said motor cylinder; the shape of the opening of said second end tapering towards the upper end of said motor cylinder.

3. A Diesel engine comprising a motor cylinder; a fuel mixing chamber; a channel connecting said mixing chamber with said motor cylinder; said mixing chamber being of substantially cylindrical shape; and said connecting channel opening into said mixing chamber in a direction which is substantially that of a tangent to the substantially circular cross section of said mixing chamber; the other end of said channel opening into the side wall of said motor cylinder; an air intake valve; and an exhaust valve; both said valves opening into said mixing chamber.

4. A Diesel engine comprising a motor cylinder; a fuel mixing chamber; a channel connecting said mixing chamber with said motor cylinder; said mixing chamber being of substantially cylindrical shape; and said connecting channel opening into said mixing chamber in a direction which is substantially that of a tangent to the substantially circular cross section of said mixing chamber; the other end of said channel opening into the side wall of said motor cylinder; an air intake valve; and an exhaust valve; both said valves opening into said mixing chamber, and their shaft axes being substantially parallel to the longitudinal axis of said motor cylinder.

5. A Diesel engine comprising a motor cylinder, a fuel mixing chamber; a channel connecting said mixing chamber with said motor cylinder; said mixing chamber being of substantially cylindrical shape; and said connecting channel opening into said mixing chamber in a direction which is substantially that of a tangent to the substantially circular cross section of said mixing chamber; the other end of said channel opening into the side wall of said motor cylinder; the shape of the opening at said second end tapering towards the upper end of said motor cylinder; an air intake valve; and an exhaust valve; both said valves opening into said mixing chamber.

6. A Diesel engine comprising a motor cylinder; a fuel mixing chamber; a channel connecting said mixing chamber with said motor cylinder; said mixing chamber being of substantially cylindrical shape; and said connecting channel opening into said mixing chamber in a direction which is substantially that of a tangent to the substantially circular cross section of said mixing chamber; the other end of said channel opening into the side wall of said motor cylinder; the shape of the opening at said second end tapering towards the upper end of said motor cylinder; an air intake valve; and an exhaust valve; both said valves opening into said mixing chamber, and their axes being substantially parallel to the longitudinal axis of said motor cylinder.

KARL MAYBACH.